United States Patent
Gold

(10) Patent No.: US 11,320,243 B2
(45) Date of Patent: May 3, 2022

(54) COMBAT IDENTIFICATION SERVER CORRELATION REPORT

(71) Applicant: BAE SYSTEMS Information and Electronic Systems Integration Inc., Nashua, NH (US)

(72) Inventor: Jack L. Gold, East Meadow, NY (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 1072 days.

(21) Appl. No.: 15/938,208

(22) Filed: Mar. 28, 2018

(65) Prior Publication Data
US 2019/0301837 A1 Oct. 3, 2019

(51) Int. Cl.
*F41G 9/00* (2006.01)
*F41G 7/00* (2006.01)
*G06F 16/29* (2019.01)

(52) U.S. Cl.
CPC .............. *F41G 9/00* (2013.01); *F41G 7/007* (2013.01); *G06F 16/29* (2019.01)

(58) Field of Classification Search
CPC ........ H04B 7/15; G06Q 50/26; G06Q 50/265; G06Q 10/00; G06F 16/29; F41G 9/00; F41G 7/007
See application file for complete search history.

(56) References Cited

U.S. PATENT DOCUMENTS

| 8,234,689 B2* | 7/2012 | Jelavic | G06Q 10/00 726/1 |
| 2004/0233097 A1* | 11/2004 | McKendree | F41G 9/00 342/62 |
| 2008/0010305 A1* | 1/2008 | Jha | G06F 16/258 |
| 2008/0052621 A1* | 2/2008 | Oliverio | G06Q 10/10 715/700 |
| 2008/0158256 A1* | 7/2008 | Russell | G06T 7/32 345/629 |
| 2008/0235318 A1* | 9/2008 | Khosla | G06K 9/6292 709/201 |
| 2011/0023132 A1* | 1/2011 | Jelavic | G06Q 50/26 726/30 |
| 2016/0267408 A1* | 9/2016 | Singh | G06N 7/005 |

OTHER PUBLICATIONS

International Search Report, PCT/US19/24591, dated Feb. 24, 2020, 10 pages.

* cited by examiner

*Primary Examiner* — Benjamin P Lee
(74) *Attorney, Agent, or Firm* — KPIP Law, PLLC; Scott J. Asmus; Gary McFaline

(57) ABSTRACT

The system and method of improving the analysis of and implementation of a combat identification (CID) server system including providing correlation reports. There are at least two forms of correlation report, namely incident report and a summation report. The summation report has two types of totals, a summary total of all interrogations, and a breakdown of totals based on the Source JU. In one example, a correlated incident would be the combination of a Lock On or Mark Point with a Weapon Release, Disengage, or Attack.

8 Claims, 9 Drawing Sheets

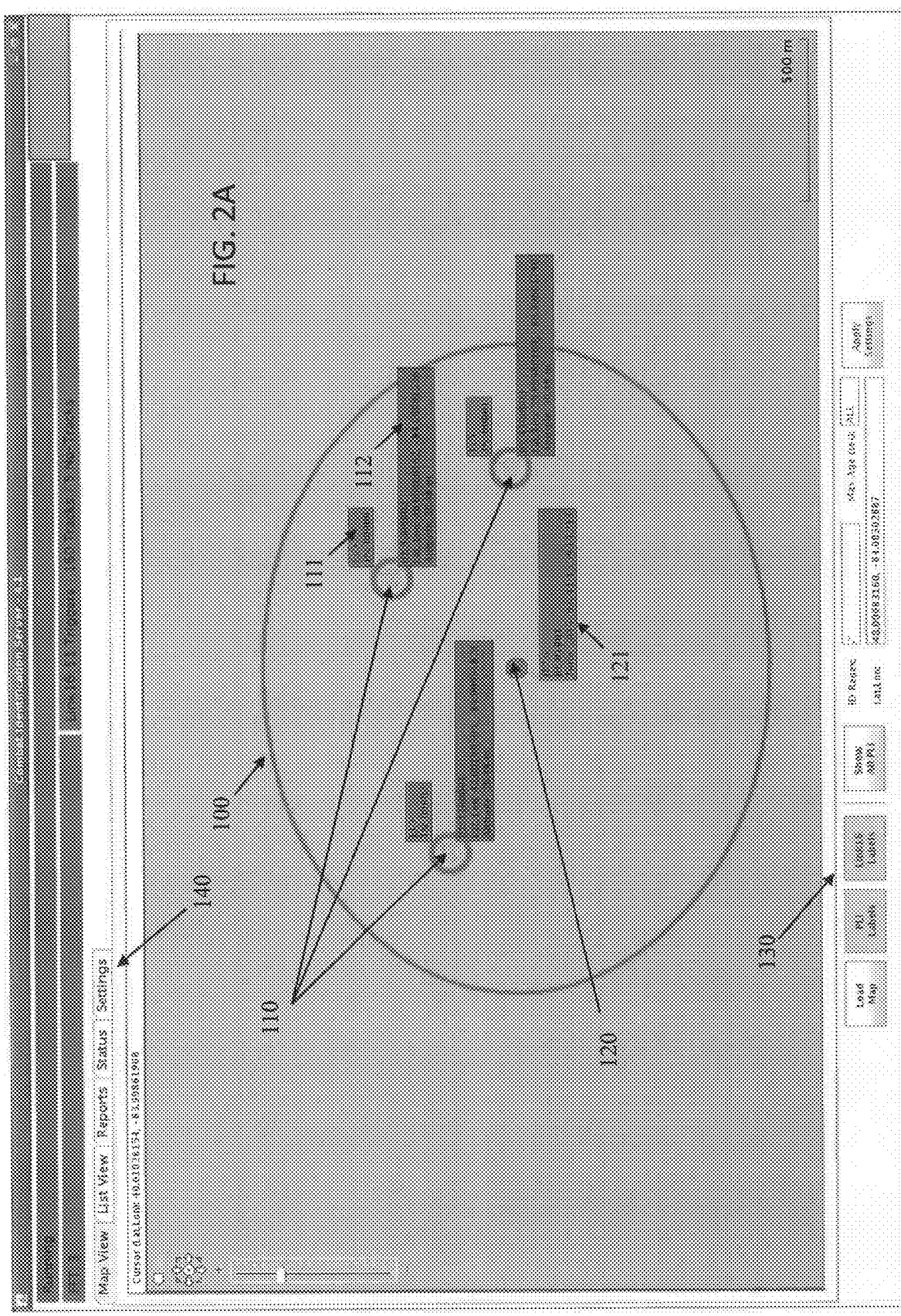

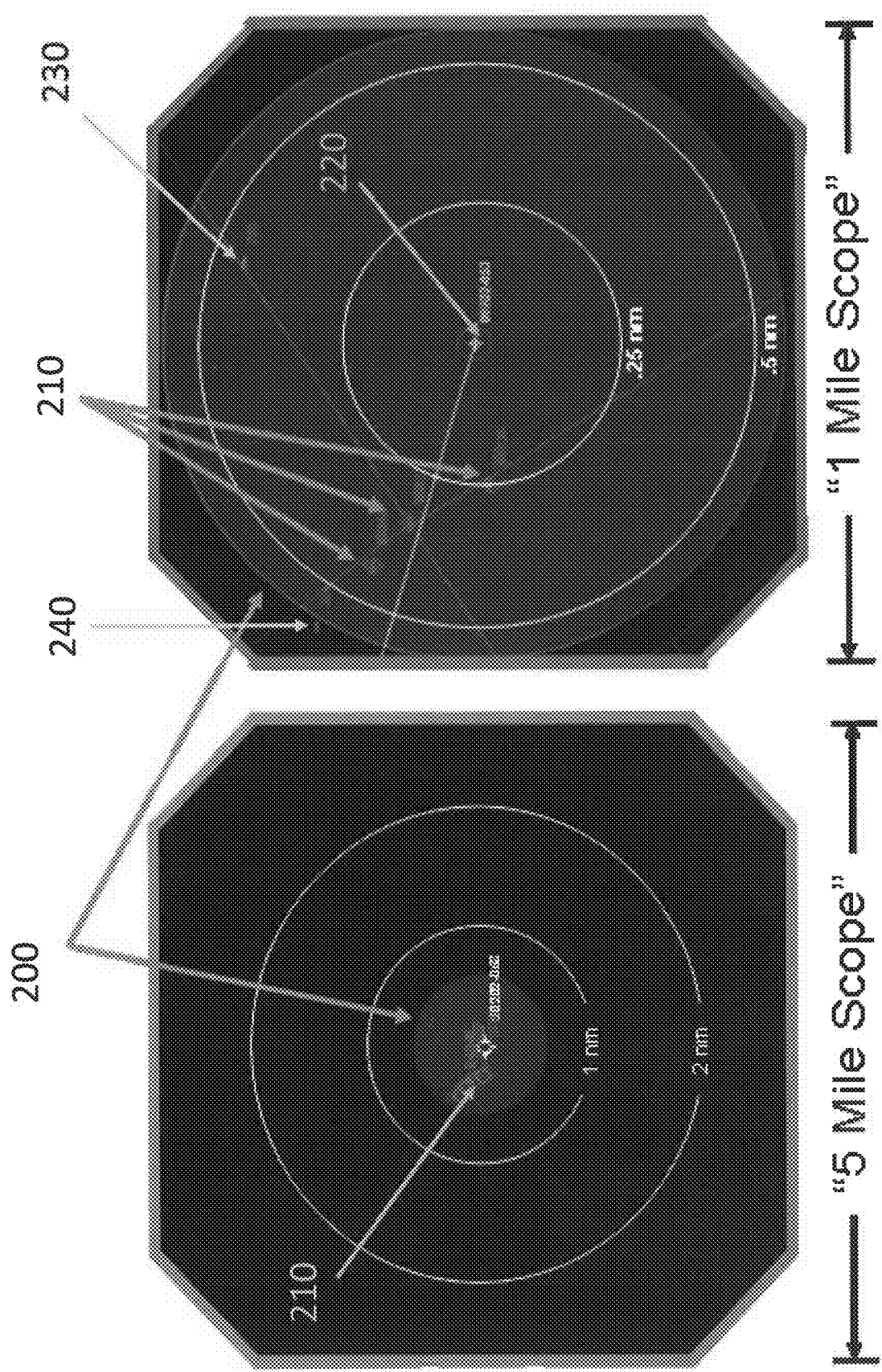

FIG. 3A

Date/Time Start: 2017-03-23 20:44:17
Date/Time End:  2017-03-30 20:30:00
------------------- SUMMARY TOTALS Total Interrogations: 28

Lock On Interrogations:
 Correlated: 14
 Attacking: 0
 Disengaging: 5
 Weapon Released: 9
Mark Point Interrogations:
 Correlated: 14
 Attacking: 0
 Disengaging: 5
 Weapon Released: 9
------------------- JU TOTALS JU: 01001
Lock On Interrogations:
 Correlated: 1
 Attacking: 0
 Disengaging: 0
 Weapon Released: 1
Mark Point Interrogations:
 Correlated: 1
 Attacking: 0
 Disengaging: 0
 Weapon Released: 1

Total Interrogations: 2

FIG. 3B

JU: 00004
Lock On Interrogations:
  Correlated: 1
  Attacking: 0
  Disengaging: 0
  Weapon Released: 1
Mark Point Interrogations:
  Correlated: 1
  Attacking: 0
  Disengaging: 0
  Weapon Released: 1

Total Interrogations: 2

JU: 00001
Lock On Interrogations:
  Correlated: 10
  Attacking: 0
  Disengaging: 5
  Weapon Released: 5
Mark Point Interrogations:
  Correlated: 10
  Attacking: 0
  Disengaging: 5
  Weapon Released: 5

Total Interrogations: 20

JU: 00003
Lock On Interrogations:
    Correlated: 1
    Attacking: 0
    Disengaging: 0
    Weapon Released: 1
Mark Point Interrogations:
    Correlated: 1
    Attacking: 0
    Disengaging: 0
    Weapon Released: 1

Total Interrogations: 2

JU: 00002
Lock On Interrogations:
    Correlated: 1
    Attacking: 0
    Disengaging: 0
    Weapon Released: 1
Mark Point Interrogations:
    Correlated: 1
    Attacking: 0
    Disengaging: 0
    Weapon Released: 1

Total Interrogations: 2

FIG. 3C

| Time Stamp | JU | Latitude | Longitude | Resp.Count | Status Information | Discrete |
|---|---|---|---|---|---|---|
| 2017-03-23 20:44:17 | 00001 | 0.000000000000000 | 0.000000000000000 | 0 | Weapon Released | |
| 2017-03-23 20:44:18 | 01001 | 40.010261540000000 | -83.998619080000000 | 3 | Weapon Released | Potential Incident |
| 2017-03-23 20:44:19 | 01001 | 40.010261540000000 | -83.998619080000000 | 3 | Weapon Released | Potential Incident |
| 2017-03-23 20:44:22 | 01001 | 40.010261540000000 | -83.998619080000000 | 3 | Weapon Released | Potential Incident |
| 2017-03-23 20:44:23 | 00001 | 0.000343323408744 | 0.000343323081325 | 0 | Weapon Released | |
| 2017-03-23 20:44:26 | 00001 | 0.100078773648784 | 0.100078678206137 | 0 | Disengaging | |
| 2017-03-23 20:44:28 | 00001 | 0.100078773648784 | 0.100078678206137 | 0 | Disengaging | |
| 2017-03-23 20:44:29 | 00001 | 0.100250435353156 | 0.100250339746799 | 0 | Disengaging | |
| 2017-03-23 20:44:32 | 00001 | 0.100250435353156 | 0.100250339746799 | 0 | Disengaging | |
| 2017-03-23 20:44:34 | 00001 | 0.100422097057528 | 0.100422001287462 | 0 | Disengaging | |
| 2017-03-23 20:46:12 | 00002 | 0.299892997537608 | 0.299892711537086 | 0 | Weapon Released | |
| 2017-03-23 20:46:13 | 00003 | 0.299892997537608 | 0.299892711537086 | 0 | Weapon Released | |
| 2017-03-23 20:46:14 | 00004 | 0.000343323408744 | 0.000343323081325 | 0 | Weapon Released | |
| 2017-03-23 20:46:15 | 00005 | 0.299892997537608 | 0.299892711537086 | 0 | Weapon Released | |
| 2017-03-30 20:27:58 | 00001 | 0.000000000000000 | 0.000000000000000 | 0 | Weapon Released | |
| 2017-03-30 20:28:00 | 00001 | 0.000171661704372 | 0.000171661540662 | 0 | Weapon Released | |
| 2017-03-30 20:28:01 | 00001 | 0.000171661704372 | 0.000171661540662 | 0 | Weapon Released | |
| 2017-03-30 20:28:04 | 00001 | 0.000343323408744 | 0.000343323081325 | 0 | Weapon Released | |
| 2017-03-30 20:28:05 | 00001 | 0.000343323408744 | 0.000343323081325 | 0 | Weapon Released | |
| 2017-03-30 20:28:08 | 00001 | 0.100078773648784 | 0.100078678206137 | 0 | Disengaging | |
| 2017-03-30 20:28:10 | 00001 | 0.100078773648784 | 0.100078678206137 | 0 | Disengaging | |
| 2017-03-30 20:28:11 | 00001 | 0.100250435353156 | 0.100250339746799 | 0 | Disengaging | |
| 2017-03-30 20:28:14 | 00001 | 0.100250435353156 | 0.100250339746799 | 0 | Disengaging | |
| 2017-03-30 20:28:15 | 00001 | 0.100422097057528 | 0.100422001287462 | 0 | Disengaging | |
| 2017-03-30 20:29:53 | 00002 | 0.299892997537608 | 0.299892711537086 | 0 | Weapon Released | |
| 2017-03-30 20:29:54 | 00003 | 0.299892997537608 | 0.299892711537086 | 0 | Weapon Released | |
| 2017-03-30 20:29:55 | 00004 | 0.299892997537608 | 0.299892711537086 | 0 | Weapon Released | |
| 2017-03-30 20:29:56 | 00005 | 0.299892997537608 | 0.299892711537086 | 0 | Weapon Released | |

FIG. 4

COMBAT IDENTIFICATION SERVER CORRELATION REPORT

STATEMENT OF GOVERNMENT INTEREST

This disclosure was made with United States Government support under Contract No. FA8726-14-C-0003 awarded by the United States Air Force. The United States Government has certain rights in this disclosure.

FIELD OF THE DISCLOSURE

The present disclosure relates to tactical intelligence systems and more particularly to improvements to the analysis of and implementation of a combat identification (CID) system.

BACKGROUND OF THE DISCLOSURE

Current tactical intelligence systems comprise systems that provide target area information by using information from multiple classification levels. Classification levels may relate to the sensitivity to the information or to the intended audience. For example, previous techniques for providing an image of a battlefield included an air controller attempting to orient a pilot of an incoming fighter plane through radio or satellite communications. Such communications tend to be severely limited by the soldier attempting to explain verbally the location of certain friendly and/or enemy targets perhaps by describing major land features. These communications have been augmented with global positioning system (GPS) and/or satellite information.

It is understood that tactical edge warfighters benefit from accurate information about a target area including precise enemy coordinates, potential threats, nearby friendly and neutral forces, non-combat personnel and facilities, and the like. Rapidly changing battlefield conditions, multiple information sources, and variously equipped tactical edge warfighters engaged with enemy combatants or tasked to strike enemy targets make the provision of such information very difficult. Similarly, emergency personnel, rescue squads and crisis management teams require similar types of information to deploy the assets and reduce the risk to the personnel involved. This was illustrated during incidents such as the 2001 World Trade Center terrorist attacks, where the lack of communications greatly hampered the response efforts.

Wherefore it is an object of the present disclosure to overcome the above-mentioned shortcomings and drawbacks associated with conventional tactical systems and provide asset tracking and combat identification server correlation reports for use in assessing and improving tactical intelligence systems.

SUMMARY OF THE DISCLOSURE

One aspect of the present disclosure is a method for analyzing the quality of target area information in a system comprising: at least one processor configured to receive information of at least one classification level; a database in communication with the at least one processor, the database including information about a region of interest; the method comprising: receiving, via the at least one processor, an interrogation from a requesting entity about the region of interest; receiving, via the at least one processor, information from the database regarding situational awareness for the region of interest of the interrogation; processing, via the at least one processor, the information from the database, including tagging the information based on an age of the information and the geographical location of one or more tracks; filtering, via the at least one processor, the information based on results from the processing step to form filtered information, including whether or not a one or more track is friendly; sending the filtered information to the requesting entity for use in determining a subsequent action by the requesting entity; performing, via the requester, the subsequent action; matching, via the at least one processor, data regarding the filtered information and the subsequent action taken by the requesting entity to create a plurality of correlated incidents; and generating, via the at least one processor, a report for use in analyzing the quality of target area information in a system following completion of the resulting action taken by the requesting party.

One embodiment of the method for analyzing the quality of target area information in a system is wherein an interrogation comprises a Mark Point or Lock On for a Sensor Point of Interest within the region of interest. In some cases, a subsequent action comprises disengaging, attacking, or releasing a weapon.

In another embodiment of the method for analyzing the quality of target area information in a system, the plurality of correlated incidents comprises a potential incident, an avoided incident, or a clear weapon release.

In certain embodiments, the report comprises a summation of all interrogations within a chosen time period, wherein the summation of all interrogations is sorted by each requesting entity of a plurality of requesting entities.

In certain embodiments, the report comprises a list of correlated incidents within a chosen period of time, wherein the list of correlated incidents is sorted by individual interrogations by each requesting entity of a plurality of requesting entities along with the subsequent action taken by the particular requesting entity.

Yet another embodiment of the method for analyzing the quality of target area information in a system, further comprises storing the report for later access by the requesting entity or a reviewer for use in analyzing the quality of target area information in the system.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 2A shows one embodiment of a display according to some principles of the present disclosure.

FIG. 2B shows one embodiment of a display according to some principles of the present disclosure at two different ranges.

FIG. 3A, FIG. 3B, and FIG. 3C show portions of one embodiment of a summary report according to some principles of the present disclosure.

FIG. 4 shows one embodiment of an incident report according to some principles of the present disclosure.

DETAILED DESCRIPTION OF THE DISCLOSURE

Figure 1A:
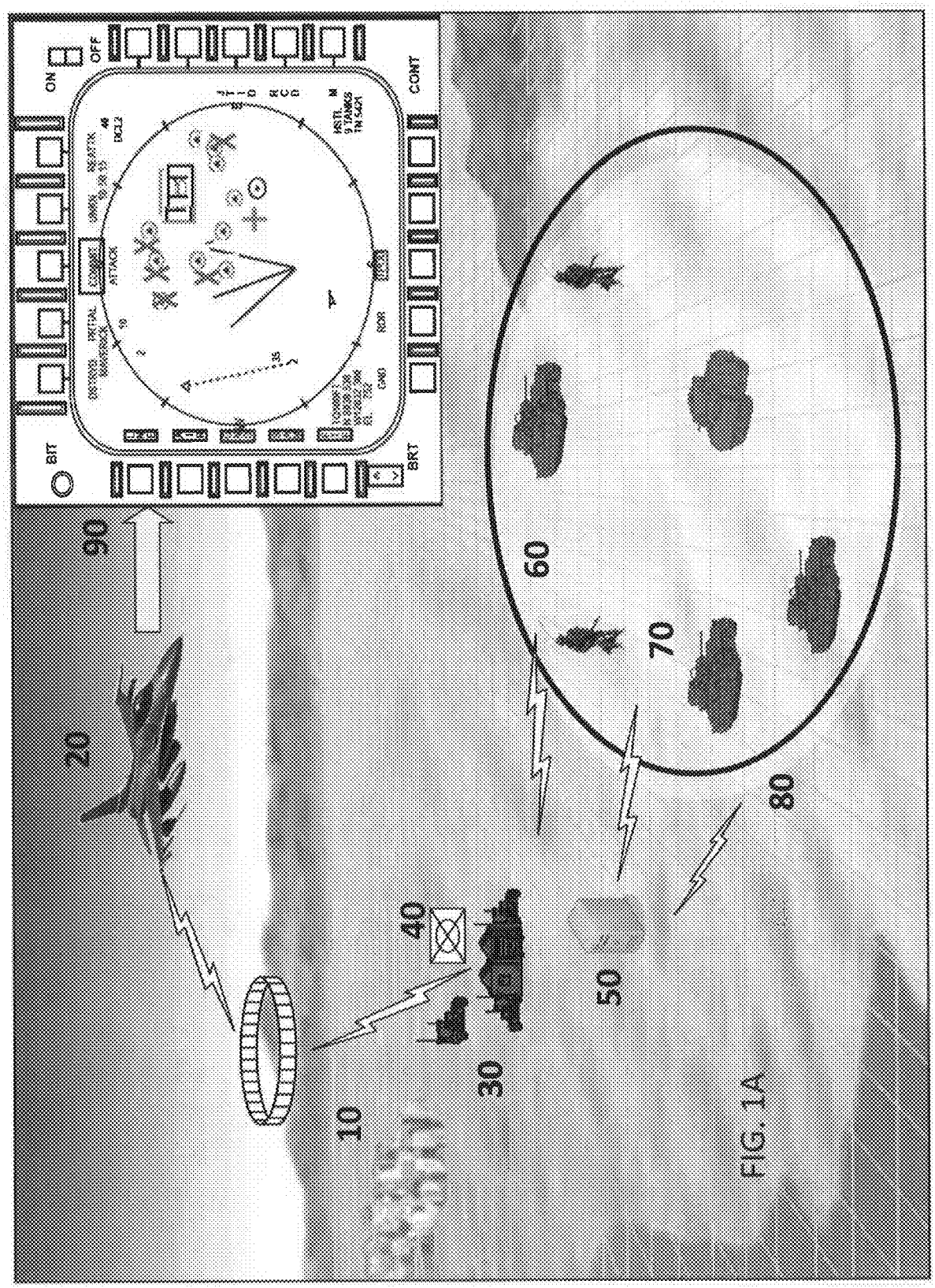
FIG. 1A shows one embodiment of a tactical intelligence system according to some principles of the present disclosure.

Currently, there is no known method or system to easily assess a combat identification (CID) server's success rate in operation. One aspect of this disclosure is a method that assesses a CID server's success rate. In one embodiment, an updated CID server is configured to collect information associated with an aircraft pilot, or other requester, releasing an ordnance and/or disengaging from a selected target. In one embodiment, the server uses this information to correlate when an aircraft selects a target and then subsequently releases an ordnance or disengages from the target. By correlating this release/disengage information the server can report how often pilots are disengaging as a result of the CID server responding with data to support the presence of friendlies in the target area. In certain embodiments, this feature provides a value as to the effectiveness of the CID server. This data may be used to assess a mission's success, assess the server's accuracy, improve the accuracy of the server, and the like. In certain embodiments, the system can be used to assess the effectivity of the CID Server or any other CID Server like entity on the network. In some cases, the reporting feature allows for the monitoring of traffic to all entities on the Link16 Network, so if there were another CID Server like entity on the network, the system could monitor the message traffic such as the J12.6 target messages on the network and keep track of how the other CID Server responds to them.

Currently, no other CID server (foreign or domestic) has the capability to assess the server's performance. In certain embodiments of this system, the assessment of a CID server's success rate can be applied to domestic and foreign systems, including those on the LINK 16 network.

In certain embodiments of the system, Link 16 and Situational Awareness Data Link (SADL) aircraft, or another requester, can receive the latest known "friendly" positions near a target or point of interest. In some cases, the CID server is configured to respond to each requester according to its LINK/SADL JU number and type of aircraft (or other vehicle). In some cases a JU number refers to a JTIDS/MIDS Unit, where JTIDS stands for Joint Tactical Information Distribution System and MDS means Multifunctional Information Distribution System.

In certain embodiments of the system, the CID server receives feeds containing the location of forces from various sources. In some cases, the source may be Blue Force Tracking (BFT), NATO Friendly Force Information (NFFI), Radio Based Combat Identification (RBCI) system, and the like. In certain embodiments, the current BFT feed comes from the U.S. Mission Management Center and contains data which indicates the location of ground troops, vehicles, transports, aircraft, etc. In some cases, the individual platforms may have GPS units incorporated into their radios which report their locations to the Mission Management Center which then forwards that data out to subscribers like the CID Server.

In certain embodiments of the system of the present disclosure, a JU number is a special identifier applied to "tracks" on the Link 16 network, or other communication network. The JU is similar to an STN (Source Track Number defined in MIL-STD-6016 as an identifier of the platform which initiates the message in the Link 16 network), but differs in that systems on the network can assign JUs to any track whereas an STN belongs to a specific track all the time. In some cases, the CID Server is allocated a block of these "JU" numbers which it assigns to tracks identified on the network and it can reuse the JUs for different tracks at a later time, if needed.

In some cases, requesters designate a ground position using their sensor point of interest (SPI) indicator and transmit a LOCK ON message over the network (e.g., Link 16/SADL). In some cases, the CID server detects the LOCK ON message and responds with the location of the five closest "friendlies" within 1 km of the requester's position (if there are any), as J3.5 tracks over the network (e.g., LINK 16/SADL). In some cases, the tracks are removed after 45 seconds. In certain embodiments of the system, reported "friendly" tracks are a snapshot of the last reported position at LOCK ON and are kept static for 45 seconds. In some cases, they are updated only once at the start of the LOCK ON.

In some embodiments of the system, a snapshot is a moment in time when the tracks are located in a certain position. The "LOCK ON" describes the moment when the snapshot is taken and refers to the requester (e.g., a pilot) invoking a Sensor Point of Interest (J12.6) indication at a specified geographical point (e.g., latitude, longitude). For the 45 seconds the tracks appear, and if they are vehicles travelling at 50 mph, for example, they will not be in the same position for very long. The pilot/operator display will still show the tracks at the location they were in when the LOCK ON was received by the CID Server. In some cases, the server may support updating the "friendly" track positions automatically.

In certain embodiments of the system of the present disclosure, a horizontal situational display (HSD) or a situational awareness (SIT) multi-function display (MFD) will display the closest tracks (e.g., ground or surface) in the vicinity of the target. As used herein, a track is a representation of a radio (or some other beacon) on the ground or surface of the water, or the like, that is transmitting its location. The radio could be tied to a dismounted soldier, a vehicle, or any other platform. A ground track generally refers to a ground platform (e.g., not air, space, surface (ships), or sub-surface (Submarines)). In some embodiments, the CID server is configurable such that different aircraft will have different track symbols and the CID server uses different tracks symbols for different aircraft and operation flight programs (OFP) in order to make sure the friendly ground track display priority for each aircraft is high enough to be displayed on the HSD/SIT/MFD. As noted above, in one embodiment an HSD is a moving-map display of the current horizontal situation around the pilot, showing friendly and enemy aircraft, the route the pilot is flying, the area being scanned by the pilot's radar, and many other useful pieces of information. A multi-function display is a computer-screen like device mounted on the instrument panel of the aircraft.

In one embodiment of the system, the requester can use a zoom and/or an expand mode on the display, as necessary, to view individual tracks (e.g., ground). If no "friends" are within 1 km of the target or SPI, the CID server can be configured to send a series of "Unknown" tracks that appear to flash at the SPI position. The SPI, or Sensor Point of Interest, is the point on the ground where the pilot is designating his "LOCK ON" or "MARK POINT" in the ground forces application. In this case, the "target" or "sensor point of interest" is the point on the ground/surface that the pilot has designated he is locking onto or "Marking Point" with the intent to release weapons at that location. In some cases, the system uses five seconds on and five seconds off per flash. In some cases the flashes repeat a total of five times. "Unknown" is a defined type of J3.5 message. The J3.5 series of messages can be configured to specify a track as "Enemy", "Friend", or "Unknown," or the like. In some cases, the CID Server only puts out "Friend" tracks unless specifically configured to put out "Unknown" tracks.

In certain embodiments, the CID Server can be configured to send less or more tracks, but in operation it is currently configured to only send the five closest "friendly" tracks to the target within the 1 km range. The purpose of this limitation was to reduce the traffic on the network. If there are less than five "friendly" tracks within the 1 km circle around the target, the pilot will get them all. If there are more than five "friendly" tracks within the 1 km circle around the target, the pilot will only see the five closest to the Sensor Point of Interest (SPI), or target.

In one embodiment, an aircrew may engage different ground positions at any time but typically will un-designate any earlier positions (or targets) in order to do so. Currently the CID server is used with aircraft, but it is conceivable that a shipboard platform or artillery battery would invoke the same kind of engagement if they were on the Link 16 network, or the like.

Referring to FIG. 1A, one embodiment of a tactical intelligence system according to the principles of the present disclosure is shown. More specifically, a communication network 10 such as Link 16, SADL, or the like, provides for communication between one or more requesters 20 (e.g., an aircraft pilot) and a ground/surface control, such as an Air Support Operations Center (ASOC) 30, Tactical Operation Center (TOC) 40, or the like. The CID server node 50, as described in more detail herein, is used to communicate and analyze information about the battlefield to/for the requester 20. In some embodiments, the battlefield information comprises maps, map coordinates, requester (e.g., aircraft) headings, coordinates/icons for identified targets and friendly forces in the area of interrogation, and the like. In some embodiments, this information may be communicated from Radio Based Combat Identification (RCBI) systems 60 or Battlefield Target Identification Devices (BTID) 70, where the BTDI is for vehicle to vehicle communication to prevent fratricide, and the like. Additionally, the CID server node 50 communicates with NATO Friendly Force Tracking (NFFT) systems, other National Systems, and Force XXI Battle Command Brigade and Below (FBCB2) systems, designed for commanders to track friendly and hostile forces on the battlefield, and the like 80.

Still referring to FIG. 1A, a display 90 is provided for the requester 20 which provides for situational awareness of the target area. In some cases, the display is on-demand and is near real-time, and can be an instrument display, heads-up display or head mounted display. In some cases, the display provides for smart pull. The on-demand capability is automated in that the display will automatically display the pilot's "on-demand" interrogations of the ground in search of friendly tracks. The display will automatically refresh and show responses to these "on-demand" requests and remove them after a specifically configured time period. The "smart pull" technology is reserved for manual interrogation by the operator of the CID Server. It gives the operator an opportunity to use the display and mouse or other interface mechanism to interrogate a specified location in the same way that a pilot would interrogate (e.g., trigger a J12.6 Sensor Point of Interest) from his cockpit. Additionally, in some cases there is a web browser interface that can be employed to give the same capability. The user interface mechanisms include the traditional keyboard and mouse as well as other ways to provide user input such as voice commands and eye tracking.

Figure 1B:
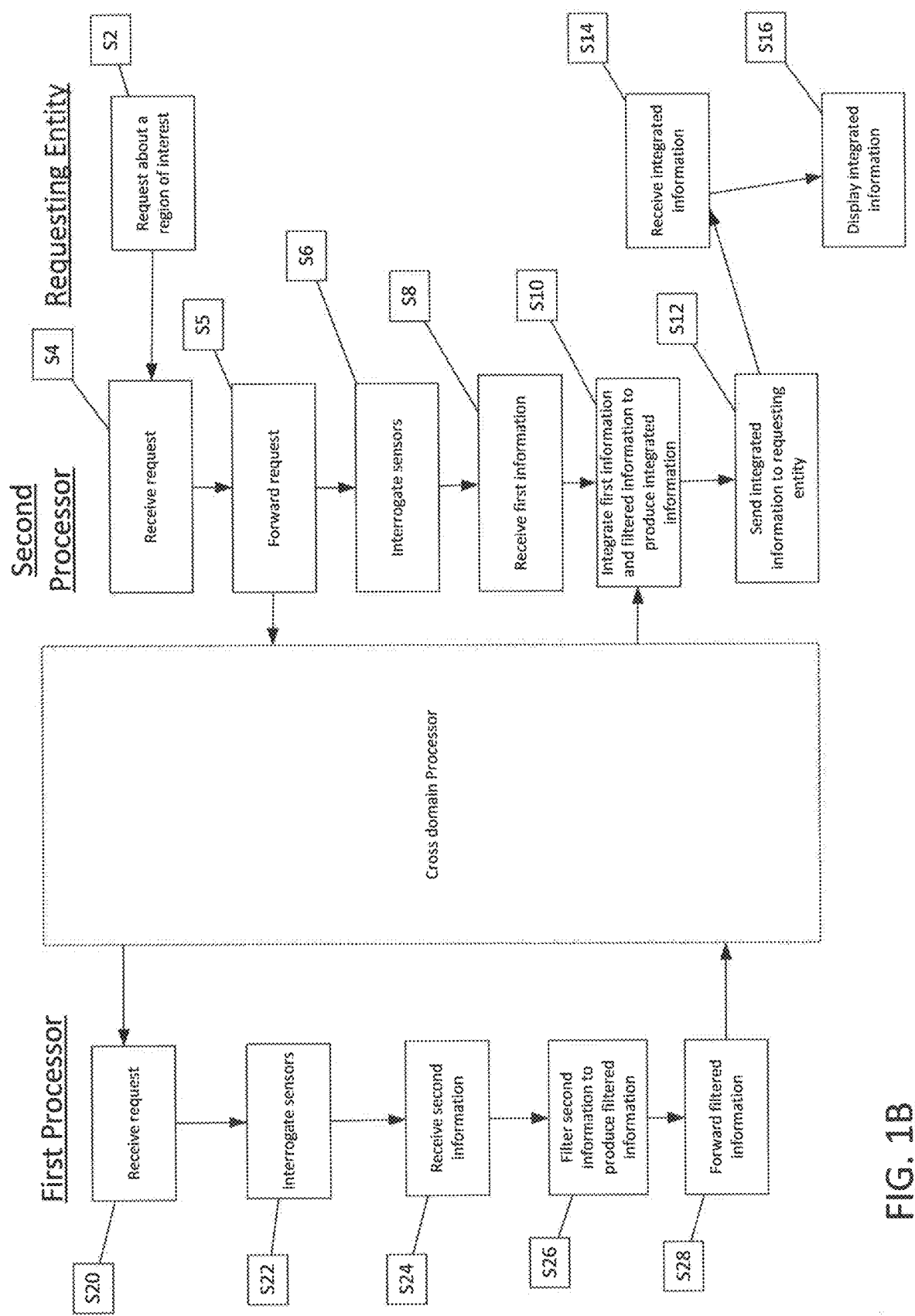
FIG. 1B is a flowchart of one embodiment of a process of a combat identification server system according to some principles of the present disclosure.

Referring to FIG. 1B, one embodiment of the CID server according to the principles of the present disclosure is shown. More specifically, a flow chart of a process is shown, which could be performed using, for example, a system including a first processor, a second processor, and a cross domain processor. In certain embodiments, no cross domain processor is needed. In certain embodiments, the system is simplified to include only a portion of the diagram such as the second processor and requesting entity and may include the cross domain processor. Additionally, in some embodiments the CID server does not directly interrogate sensors and instead the system works entirely off of situational awareness data. It should be noted that reference to first and second processor includes co-located processing on a single computer, multi-core processors as well as separated computing processing capabilities. The cross domain processor is a computing resource that support cross domain interoperability that allows different domains to interact in information exchange.

Still referring to FIG. 1B, at Step S2 a requesting entity makes a request for information about a region of interest. At step S4, the request is received, by a processor (e.g., second). At step S5, the request may be sent to a first processor through a cross-domain processor. In certain embodiments, the first and second processors may receive information at different classification levels. Some examples of different classification levels includes, for example, Confidential, Secret, and Top-Secret.

At step S6, the second processor interrogates sensors in communication with the second processor. Some examples of the sensors include: Radio Based Combat Identification (RBCI) and Battlefield Target Identification Devices (BTID).

The interrogation in this example is based on the region of interest. At step S8, first information from the sensors is received by the second processor. Meanwhile, at the first processor, the request is received at step S20. At step S22, the first processor interrogates sensors in communication with the first processor based on the region of interest. At step S24, the first processor receives second information from the sensors. At step S26, the first processor filters the second information based on the first and second classification levels to produce filtered information, if necessary. For example, if the first processor has a higher classification level, the first processor may remove certain information from the second responses. Alternatively, if the first and second processors have the same classification levels or the second processor has a higher classification level, the first processor may not remove any information. At step S28, the first processor sends the filtered information to the second processor through the cross-domain processor. At step S10, the second processor integrates the first responses and the filtered information to produce integrated information. In one example, the integrated information would be filtering higher classified information if being transmitted to a lower classified recipient.

At step S12, the integrated information is sent to the requesting entity. At step S14, the integrated information is received by the requesting entity. At step S16, the integrated information is displayed to the requesting entity. In an alternate configuration, the Cross Domain Processor can be removed entirely and the first processor/second processor communication would occur without any issue. In that case, S5 Forward Request would go directly to S20 Receive Request and S28 Forward filtered information would go directly to S10 Integrate first information and filtered information to produce integrated information. This would put both processors in the same Classification level (e.g., Top Secret) as they would be directly sharing the same information without any filtering of data.

Referring to FIG. 2A, one embodiment of a display according to the principles of the present disclosure is shown. More specifically, a range ring 100 is shown. In certain embodiments, the range ring represents a circle with a radius of about 1 km. In other examples the range ring is an oval, square, polygonic or other shape. Within the range ring 100, there are one or more tracks 110 as well as a sensor point of interest (SPI) 120. In certain embodiments, each track 110 will have a corresponding information, such as J3.5 and/or track number (TN) designations 111. In certain embodiments, each track will have a corresponding ID number, as well as location information such as latitude, longitude, altitude, and the like 112 for the track. In certain embodiments, the SPI will have a corresponding J12.6 designation for the requester (e.g., JU). In some cases, the SPI will have a time/date stamp and other relevant information 121. In certain embodiments, the CID server display will have additional features that can be toggled on and off which are controlled via buttons on the footer 130 or header 140 of the display page, or the like. In certain embodiments, many types of displays are possible that use the internal capabilities of the server without exposing all of the capabilities to the user directly. For instance, far more information on the tracks is collected in addition to location and Track Number. In some cases, the kind of platform the track number is associated with and the speed at which it might be moving are collected. In certain cases, the information collected comes from received BFT and/or NFFI data which is forwarded from the government's personnel tracking facilities.

Still referring to FIG. 2A, one embodiment of the display is shown. There, bars at the top indicate the status of the system and they can change color from Green to Yellow to Red depending on the status. When the system is off, the bars are Gray. The top bar is an "overall status" of the system. The friendly force tracking (FFT) bar is the status of the FFT feed. The Link16 bar is the status of the Link16 connection. In some cases, there is a map zoom slider on and a map navigation control that allows the user to change the view of the display to a different portion of the map.

In certain embodiments, a Load Map button allows the user to load map images for visual association of the location of the tracks to recognizable ground features. PLI Labels and Link16 label buttons toggle the display of the Link16 J3.5 and J12.6 labels as well as the FFT ID labels. In the figure, the display is currently showing the labels. Deselecting the buttons would make them disappear. In certain cases, a filtering capability that allows the user to filter the display for specific ground tracks is shown. This can be helpful if there is a lot of clutter among the blue tracks.

In some embodiments, an ID Regex allows the user to enter a regular expression that filters specific ground track IDs. For instance, changing the ".*" (i.e., all tracks) to "*2" would cause the 4300001 and 4300003 tracks to disappear from the screen loving only the 4300002 track on the display. In some cases, a Max Age (sec) filter is used to hide older tracks. So, if some tracks have been in the system for multiple days and one only wanted tracks for the last 5 minutes, one would put in 300 and hit the Apply Settings button. Any tracks older than 5 minutes would be removed from the display.

In some cases, a Lat, Lon field allows the user to quickly center the display on the specified geographical point defined by the latitude and longitude entered. And, the List View tab shows a listing of all of the FFT tracks and all of the detail data associated with those tracks. In certain embodiments of the system of the present disclosure, a Reports tab allows the user to dump predefined reports for use at a later time by the requestor, a reviewer, or the like.

FIG. 2A shows a "Lock On/Mark Point" position 120 in the hexagon at the center of the image. The "3" in the top bar indicates the total number of "friendly" tracks within the 1 km radius. The J12.6 label 121 contains the Source Track Number (represented by the JU value) that sent the "Lock On/Mark Point" and the time (Zulu) when it occurred. The J3.5 labels 111 indicate the response messages that are sent back to the requesting platform (e.g., JU: 01001) indicating there is a "friendly" at that location. In some cases, the ID labels 112 are informational and show the identification number for the track on the ground network along with the geographical position in 3-space (e.g., Lat/Long/Alt).

Referring to FIG. 2B, one embodiment of a display according to the principles of the present disclosure at two different ranges is shown. More specifically, the left side of the figure displays a 5 nautical mile range and the right side of the figure is zoomed in to display a one nautical mile range. The interrogation area 200 is the same in both images, at about 0.5 nm in this embodiment. Within the interrogation area are several J3.5 tracks, or the like 210. In the left side of the image, the J3.5 tracks are designated as "friendlies." These J3.5 tracks are shown along with a J12.6 SPI (Lock On or Mark Point) 220 in the right side of the figure. In the figure, the Red 701 230 is an enemy position. In certain embodiments, the CID Server does not track enemy positions and this figure is a conceptual view of a pilot's cockpit display which might display enemy positions, unknown positions, neutral positions, and friendly positions. In certain embodiments, a C2 (Command and Control) type system would manually input an "enemy position" that would be received by all viewers of that data on the network.

Still referring to FIG. 2B, track 324 240 is outside the search region in the display on the right and so it does not have a J3.5 circle around it or a second number applied to it. All of the other tracks within the search region have two numbers. One is representative of the ground radio's assigned number on the network. The other is the number that the CID Server assigns when it reports the J3.5 to the Link16 Network. In certain embodiments, a pilot would not see the 324 track 240 or any of the other numbers that are not visible, and the pilot would only see the blue circles and the J3.5 identifier. In some cases, the pilot might see symbols of some sort there and they might not depending on the system settings. In some respects this is one reason that a CID Server is employed. Without it, the pilot might not see the ground tracks at all before releasing a weapon.

Still referring to FIG. 2B, this is an example of a pilot's display at two different zoom levels. The left image shows a pilot's view at 5 nautical mile diameter. While the second display shows the same display at 1 nautical mile diameter. In both cases, the icons represent the positions of ground tracks (J3.5) 210 sent by the CID Server. The crosshairs are directly over the "Lock On/Mark Point" (J12.6) 220 sensor point of interest (SPI).

In certain embodiments of the system of the present disclosure, correlation reports are generated to correlate CID server interrogations (e.g., J12.6) with Status Information Discrete (SID) values specified in an interoperability settings table. In some cases, SID values may be associated with Weapon Release, Disengage, and Attack. The SID defines a Sensor Point of Interest (SPI) message as being a Weapon Release, Disengage, or Attack message, or the like. In certain cases, Lock On and Mark Point are also SID values.

In some embodiments the CID server interrogations are what the CID Server calls a J12.6 (Sensor Point of Interest) message that it is concerned with and the SID is a status information discrete which is a field within the J12.6 message that identifies the message as one of several possible types (e.g., NO STATEMENT, ATTACKING, INVESTIGATING, MISSILE IN FLIGHT/WEAPON RELEASED, NEW SENSOR TARGET REPORT, CANCEL SENSOR TARGET REPORT, TRACK/TARGET DESTROYED, DISENGAGING, MARK POINT/POINT OF INTEREST, LOCK ON/DESIGNATED SURFACE TARGET, BATTLE DAMAGE ASSESSMENT UNKNOWN, and RECOMMEND ATTACK).

In one embodiment of the system of the present disclosure, a correlation report provides data for use in determining if a Weapon Release, Disengage, or Attack occurred immediately following a Lock On or Mark Point call and report when this occurs. As used herein, the only difference between a Lock On and Mark Point is the SID value assigned to the J12.6 message being sent. Different platforms (e.g., F-15, F-16, B-2, etc.) are configured to use one over the other depending on their specific tactics, techniques, and procedures. The CID Server is configurable to assign one, the other, or both designations to a platform for response. Meaning, if the operator configures the server to respond to Lock On for a platform, it will. If the operator configures the server to respond Mark Point or both Mark Point and Lock On, it will.

In some embodiments, there are two formats of the correlation report. The first format (e.g., summation) sums the total number of incidents as described above. The second format (e.g., incident) correlates and lists each individual correlated incident along with its position, associated STN, total number of CID server responses sent, and the SID associated with the correlation (Weapon Release, Disengage, or Attack), for example. In certain cases, the CID Server "listens" for the SPI (J12.6) messages with Mark Point or Lock On values in the SID (Status Information Discrete) field. The CID server then formulates response messages to the originating platform (designated by the STN) and submits "responses" back to the requesting platform. A correlated incident would be the combination of a Lock On or Mark Point with a Weapon Release, Disengage, or Attack, for example. Thus, in this embodiment, one could have six possible "correlated incident" types (or pairs). For example, a "correlation" is the term used to define the association of an event of Lock On or Mark Point with a subsequent event of one of Weapon Release, Disengage, or Attack. Every incident has a position defined by the latitude, longitude, and altitude of where the Mark Point or Lock On designation is made. A pilot places his/her SIP at a location on the ground/surface which yields the geographical "position."

As shown in FIGS. 3A-3C, the summation report has two types of totals, a summary total of all interrogations, and a breakdown of totals based on the particular Source JU. In this example, the report shows that there were 28 total interrogations, 14 of which correlated to a Lock On Interrogation and 14 were correlated to a Mark Point Interrogation. For each type of interrogation the correlations are broken down into how the JU responded. In this case, for both the Lock On and Mark point there were 9 Weapon Released and 5 Disengaging. See, FIG. 3A. Following the summary of totals is each individual Source JU totals using the same format as the summary. See, FIG. 3B and FIG. 3C. Adding up the total interrogations for each JU will match the Total Interrogations of the summary.

Still referring to FIG. 3A, FIG. 3B, and FIG. 3C, the summation report displays total interrogations that have occurred within the Date/Time specified at the top of the report. Summary totals cover all platforms over the given time period. The interrogation data is broken down further by JU number over the same period to give summation for each platform as well under the JU Totals section. See, FIG. 2A for example, where a requestor, JU 01001, during an interrogation has no indicator depicting if it is a Lock On or Mark Point. That information is unnecessary to the user at the time of display. While this information is displayed as textual data, it can be presented in various visuals on the display to the requestor.

In certain embodiments, the incident report displays each interrogation on its own line as seen in FIG. 4. There, each line corresponds to an interrogation at a particular time for a particular source JU and how the interrogation was responded to. If one compares the incident report to the summation report, the Weapon Release and Disengaging totals should match.

Still referring to FIG. 4, the bolded lines indicate that Aircraft 01001 conducted a "Lock On" or "Mark Point" at the specified location, received 3 friendly response tracks, and then conducted a Weapon Release indicating a "potential incident." In some cases, other discrete results might include an "avoided incident," a "potential incident," a "clear weapon release," or the like. In certain embodiments, an "avoided track" may be a track within 1 km of a Lock On/Mark Point that is correlated with a Disengage report. A "potential incident" occurs when a pilot designates an SPI with "Lock On/Mark Point" that then correlates with a "Weapon Release." One will not know if an incident actually occurs until reports after the attack come in. As such, it is only a "Potential Incident" at that point in time.

In certain embodiments, depending on a pilot's Tactical Techniques and Procedures (TTP) there may be a number of different discretes associated with particular information. In some embodiments, there are different discretes for J12.6s that target air, subsurface, surface, land, and space. In one embodiment, the CID Server only looks at Land and Surface J12.6's and the discretes for these J12.6's are the same. In one embodiment, the following possible discretes are used for Land and Surface: 1) No Statement—this discrete tends to be employed by foreign aircraft when they do not understand the meaning of the other discretes or do not know what the situation calls for when they generate a sensor point of interest message. On domestic aircraft it is used for updating target/track data that already exists on the network by ID. The message would contain other updated information and simply tell the processor of the message to apply the new values to the current identified system; 2) Attacking—this discrete might be employed by the pilot to notify monitors of the network that his/her maneuvers are changing. It could identify that the pilot is using guns instead of missiles or bombs, for example; 3) Investigating—this discrete is used to indicate that the pilot is not necessarily attacking or targeting a point for weapon release. In this case the pilot is "looking" at the point on the ground to keep track of it for some reason known only to him/her; 4) Missile in Flight/Weapon Released—This discrete indicates that the pilot has already fired or released his/her weapons; 5) New Sensor Target Report—this value is set on the "first" report of a new sensor target indicating a subsequent J12.6 will follow with a specific discrete; 6) Cancel Sensor Target Report—this value allows the pilot to remove his/her J12.6 from the network. Once the pilot puts the J12.6 out on the network, it continues to be broadcast until he/she submits this "cancel"; 7) Track/Target Destroyed—a pilot has to manually enter the message with this discrete to notify all monitors of the network that the target/track that was at the specified location has been destroyed and is no longer a threat; 8) Disengaging—this discrete indicates that the pilot has broken off his/her attack on the target; 9) Target Partially Destroyed—indicates a target has been attacked and hit. It is employed to allow the pilot to maintain the track on the network; 10) Mark Point/Point of Interest—this is a point of interest or potential target; 11) Lock On/Designated Surface Target—the indicates a sensor acquisition has been obtained on the specified land track; 12) Battle Damage Assessment Unknown—indicates that the pilot does not know the battle damage applied to the target; 13) Recommend Reattack—this indicates another mission should be conducted against the target; and the like.

Figure 5:
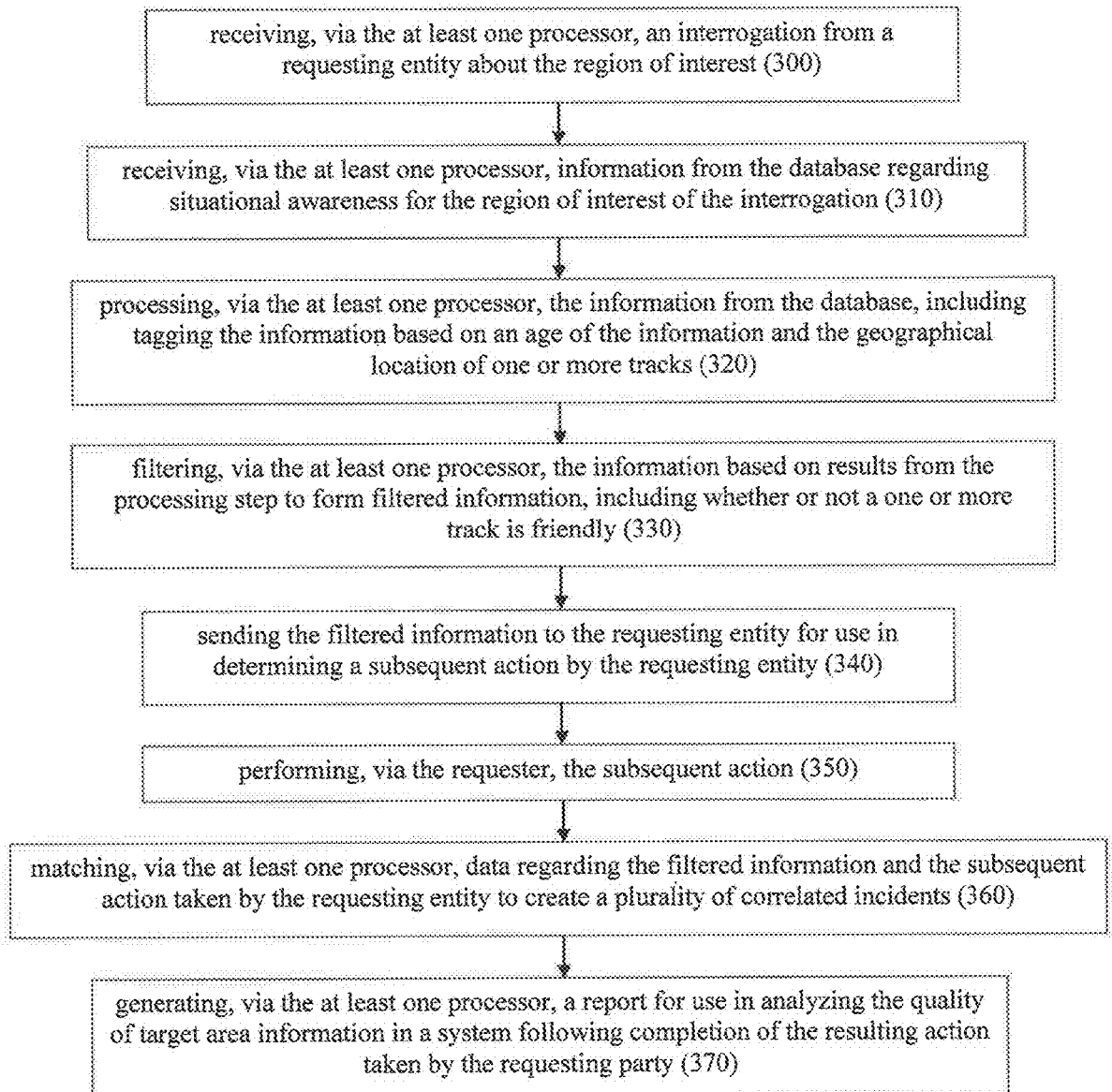
FIG. 5 shows a flowchart of one embodiment of a method according to some principles of the present disclosure.

Referring to FIG. 5, a flow chart of one method according to the principles of the present disclosure is shown. More specifically, in one embodiment, the at least one processor receives an interrogation from a requesting entity about the region of interest (300) and the at least one processor receives information from the database regarding situational awareness for the region of interest of the interrogation (310) to process the information from the database, including tagging the information based on an age of the information and the geographical location of one or more tracks (320). In some cases, the at least one processor filters the information based on results from the processing step to form filtered information, including whether or not a one or more track is friendly (330). In certain embodiments, the filtered information is sent to the requesting entity for use in determining a subsequent action by the requesting entity (340) and the requester performs the subsequent action (350). The at least one processor matches data regarding the filtered information and the subsequent action taken by the requesting entity to create a plurality of correlated incidents (360) and the at least one processor generates a report for use in analyzing the quality of target area information in a system following completion of the resulting action taken by the requesting party (370).

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method for analyzing target area information in a system comprising:
   at least one processor configured to receive information of
      at least one classification level;

a database in communication with the at least one processor, the database including information about a region of interest;

the method comprising:

receiving, via the at least one processor, an interrogation from a requesting entity about the region of interest;

receiving, via the at least one processor, information from the database regarding situational awareness for the region of interest of the interrogation;

processing, via the at least one processor, the information from the database, including tagging the information, said tagging comprising an age of the information and the geographical location of one or more tracks;

filtering, via the at least one processor, the information based on results from the processing step to form filtered information, including whether or not a one or more track is friendly;

sending the filtered information to the requesting entity for use in determining a subsequent action by the requesting entity;

performing, via the requester, the subsequent action;

correlating, via the at least one processor, data regarding the filtered information and the subsequent action taken by the requesting entity to create a plurality of correlated incidents wherein the plurality of correlated incidents comprises a potential incident, an avoided incident, or a clear weapon release; and generating, via the at least one processor, a report for use in analyzing the target area information in a system following completion of the subsequent action taken by the requesting entity.

2. The method for analyzing the target area information in a system according to claim 1, wherein the filtering comprises an interrogation for a Mark Point or Lock On for a Sensor Point of Interest within the region of interest.

3. The method for analyzing the target area information in a system according to claim 1, wherein the subsequent action comprises disengaging, attacking, or releasing a weapon.

4. The method for analyzing the target area information in a system according to claim 1, wherein the report comprises a summation of all interrogations within a chosen time period.

5. The method for analyzing the target area information in a system according to claim 4, wherein the summation of all interrogations is sorted by each requesting entity of a plurality of requesting entities.

6. The method for analyzing the target area information in a system according to claim 1, wherein the report comprises the list of correlated incidents within a chosen period of time.

7. The method for analyzing the quality of target area information in a system according to claim 6, wherein the list of correlated incidents is sorted by individual interrogations by each requesting entity of a plurality of requesting entities along with the subsequent action taken by the particular requesting entity.

8. The method for analyzing the quality of target area information in a system according to claim 1, further comprising storing the report for later access by the requesting entity or a reviewer for use in analyzing the quality of target area information in the system.

\* \* \* \* \*